United States Patent Office 3,780,016
Patented Dec. 18, 1973

3,780,016
DIPEPTIDE ANTIBIOTIC AND METHOD FOR THE PRODUCTION THEREOF
Richard M. Gale and David H. Lively, Indianapolis, Ind., assignors to Eli Lilly and Company, Indianapolis, Ind.
No Drawing. Filed Mar. 2, 1972, Ser. No. 231,386
Int. Cl. C07c *103/52*
U.S. Cl. 260—112.5    2 Claims

ABSTRACT OF THE DISCLOSURE

Dipeptide antibiotic, fumarylcarboxyamido - L-2,3-diaminopropionyl-L-alanine is produced by culturing the organism *Streptomyces collinus* NRRL 5332 under submerged aerobic fermentation conditions and is isolated by chromatography of the filtered fermentation broth over activated carbon, followed by chromatography of the active fractions obtained therefrom over acid-washed alumina. The antibiotic displays significant activity against *Salmonella gallinarum* and *Trichomonas vaginalis.*

BACKGROUND OF THE INVENTION

This invention relates to a novel dipeptide antibiotic substance. In particular this invention relates to the dipeptide, fumarylcarboxyamido-L-2,3-diaminopropionyl-L-alanine.

Fowl, and in particular chickens, infected with the organism *Salmonella gallinarum* succumb to the disease known as fowl typhoid. Present methods employed for the control of this disease include immunization, as well as chemotherapy with such agents as the sulfonamides and the antibiotics, notably chloromycetin. Of these methods, immunization has met with limited success. The treatment of fowl with such agents as the sulfonamides has met with limited success. At present the antibiotics offer the best mode of control. Because of the economic effect which this disease has on the poultry industry, there is a need for more effective agents in the control of fowl typhoid.

It is an object of this invention to provide a new antibiotic compound. It is a further object of this invention to provide an antibiotic compound which is effective in inhibiting the growth of *Salmonella gallinarum*, the causative agent of fowl typhoid.

SUMMARY OF THE INVENTION

The dipeptide antibiotic of this invention, fumarylcarboxyamido-L-2,3-diaminopropionyl-L-alanine, is produced by culturing a new strain of *Streptomyces collinus*, Lindenbein, which is designated by its culture deposit number, NRRL 5332, under submerged aerobic fermentation conditions in a nutrient culture medium containing assimilable sources of carbon, nitrogen and inorganic salts. The antibiotic is recovered from the fermentation by chromatography of the filtered fermentation broth over activated carbon. Evaporation of the eluate fractions containing antibiotic activity yields the antibiotic in crude form. The antibiotic is purified by further chromatography of the crude materal over acid-washed alumina. The active fractions containing the antibiotic obtained from the alumina column were combined and evaporated in vacuo to obtain the antibiotic in a purified solid form. Crystallization of the purified solid antibiotic from aqueous methanol provides the crystalline antibiotic.

The dipeptide antibiotic of this invention displays significant activity against the causative organism of fowl typhoid, *Salmonella gallinarum*. Accordingly, the antibiotic is useful in inhibiting the growth of this organism and in combating fowl typhoid.

DETAILED DESCRIPTION OF THE INVENTION

The dipeptide antibiotic, fumarylcarboxyamido-L-2,3-diaminopropionyl-L-alanine, of this invention is represented by the following structural formula.

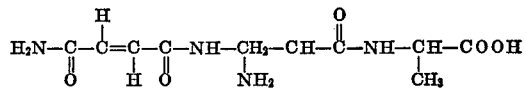

The crystalline antibiotic melts at about 275–280° C. with decomposition. As can be seen from the structural formula, the antibiotic comprises 2 amino acids, alanine and 1,3-diaminopropionic acid, the terminal amino group of which is derivatized as the monoamide of fumaric acid. The antibiotic readily forms salts with mineral acids. For example, the hydrochloride salt was prepared by the addition of methanolic hydrochloric acid to a slurry of the antibiotic in methanol. The hydrochloride salt of the antibiotic melts with decomposition at about 235–245° C. In a similar manner the hydrobromide, the sulfate and like salts formed with mineral acids can be prepared. Because of the presence of the free terminal carboxylic acid group the antibiotic forms salts such as the alkali metal salts for example, the sodium salt and the potassium salt by treating the antibiotic in the free acid form with a base such as sodium hydroxide or potassium hydroxide.

The structure of the antibiotic was confirmed by the isolation of fumaric acid, L-2,3-diaminopropionic acid and L-alanine by chromatography of the hydrolysate of the antibiotic. The antibiotic was hydrolyzed by heating a solution of the antibiotic in 6 N hydrochloric acid at the reflux temperature for 18 hours.

As previously mentioned, the dipeptide antibiotic of this invention is prepared by culturing a novel strain of *Streptomyces collinus*, Lindenbein, which is designated by its culture deposit number NRRL 5332. The organism is cultured in a nutrient culture medium containing assimilable sources of carbon, nitrogen and inorganic salts under submerged aerobic fermentation conditions until a substantial amount of the antibiotic is produced. The antibiotic is produced by the organism in a variety of nutrient media. For example, various sources of carbon and nitrogen can be employed. As sources of nitrogen the amino acids or mixtures of amino acids, distiller's solubles, casein hydrolysates and like nitrogen sources can be employed. Likewise a variety of carbon sources, such as the carbohydrates, sucrose and glucose, can be used as well as the more commercially feasible sources of carbon, such as molasses.

In producing the antibiotic of this invention spores of the organism are transferred to an agar slant and the slant is incubated to obtain viable growth. A small portion of the spores thus obtained is transferred to a small volume of a vegetative medium and the medium incubated to obtain vegetative growth of the organism. The vegetative growth thus obtained is then transferred to the larger fermentation medium for the production of the antibiotic. The antibiotic producing organism can be grown on a small scale, for example in 1 liter shake flasks to produce the antibiotic in experimental quantities or alternatively, it can be grown in larger tanks such as 250 gal. fermentors or larger fermentors to produce greater quantities of the antibiotic. As with most streptomycetes aeration of the nutrient medium promotes the growth of the organism and the production of the antibiotic. For the production of the dipeptide antibiotic of this invention, the production medium is desirably aerated with sterile air throughout the course of the fermentation. Quantities of air between about 0.2 volumes of air per volume of fermentation medium per minute to about 0.75 volumes of air per volume of medium per minute are beneficial in the production of the antibiotic.

Likewise, with most fermentations of streptomycete organisms the presence of inorganic salts promotes the growth of the organism and is beneficial in the production of the antibiotic. Such salts as will supply the ions of potassium, sodium chloride, bromide, carbonate, phosphate, calcium, and the like are added to the production medium in minor amounts. Likewise certain trace elements appear beneficial in the production of the dipeptide antibiotic of this invention. Such trace amounts of elements are supplied in sufficient amounts as impurities in the other nutrient ingredients added to the fermentation medium.

Whereas maximum production of the antibiotic appears to occur between 40 and 48 hours, longer fermentation times can be employed with only a minimum amount of loss of antibiotic activity unless the time extends beyond about 72 hours. Neutral or slightly acidic pH is conducive to maximal growth of the antibiotic and optimal antibiotic yields are obtained when the harvest pH of the fermentation broth is about pH 4.0–4.5.

As previously mentioned the organism producing the antibiotic of this invention has been classified as a novel strain of *Streptomyces collinus*, Lindenbein. In the paragraphs which follow the taxonomic description of the new strain is provided. The methods recommended for the International Streptomyces Project, [Shirling, E. B. and Gottlieb, D. 1966, Methods for the Characterization of Streptomyces Species. Intern Bull. Systematic Bacterial. 16, 313–340, (1966)] for the characterization of streptomyces species have been used along with certain supplementary tests. Color names were assigned according to the Inter-Society Color Council—National Bureau of Standards (ISCC-NBS) method. Kelly and Judd, The ISCC-NBS Method of Designating Colors and a Dictionary of Color Names, U.S. Dept. of Commerce, Circ. 553, Washington, D.C., 1955. Figures in parentheses refer to the Tresner and Backus Color Series, System of Color Wheels for Streptomycete Taxonomy, Appl. Microbiol. 11, 335–338. The numbers in brackets refer to the Maerz and Paul color blocks in Maerz and Paul, Dictionary of Color, McGraw-Hill, Inc. N.Y. 1950. Cultures were grown at 30° C. for 14 days unless otherwise indicated.

MORPHOLOGICAL CHARACTERISTICS

The organism of this invention produces relatively short spore chains which result in poorly developed spirals of only a few turns. When larger chains occur, they usually coalesce as masses of spores. Subglobose shaped masses of spores appear to originate at the hooked or spiral ends of spore chains and to be held together by fluid. The culture produces gray, aerial mycelium. The vegetative mycelium is brownish-yellow.

MICROSCOPIC MORPHOLOGY

Spores occur in relatively short chains of from 3–10 spores per chain. The short spore chains result in poorly developed spirals of only a few turns. Spores coalesce to form subglobose shaped masses, which appear to be held together by fluid. The spores are oval to cylindrical in shape and measure 0.804 microns times 1.72 microns. The spores are smooth as determined by electronmicroscopy.

CULTURAL CHARACTERISTICS

| | |
|---|---|
| Yeast extract-malt extract agar, ICP No. 2. | Abundant growth, reverse light yellow brown [13H7]; abundant aerial mycelium and spores (GY) medium gray e to brownish gray 3li; no soluble pigment. |
| Oatmeal agar, ICP No. 3 | Good growth, reverse medium yellowish brown [14I7]; fair to good aerial mycelium and spores (GY) medium gray e; no soluble pigments. |
| Inorganic salts-starch agar, ICP No. 4. | Good growth, reverse light grayish yellowish brown [13D2]; good aerial mycelium and spores (GY) light gray d; no soluble pigment. |
| Glycerol-asparagine agar, ICP No. 5. | Good growth, reverse pale yellow [11C2]; fair to good aerial mycelium and spores (W) white b to light olive gray (GY) 2ih; no soluble pigment. |
| Tyrosine agar | Good growth, reverse light yellow brown [12H7]; good aerial mycelium and spores (W) white a; no soluble pigment. |
| Bennett's agar | Abundant growth, reverse light grayish olive [14H4]; fair to good aerial mycelium and spores (GY) medium gray e; no soluble pigment. |
| Calcium malate | Good growth, reverse pale yellow [11C2]; good aerial mycelium and spores (W) white a to yellowish gray (GY) 2dc; no soluble pigment. |
| Emerson's agar | Good growth, reverse grayish yellow [12J5]; no aerial mycelium or spores therefore no color assignment, no soluble pigment. |
| Yeast extract agar | Abundant growth, reverse grayish greenish yellow [12I2]; food aerial mycelium and spores (GY) medium gray g; no soluble pigment. |
| Tomato paste-oatmeal agar | Abundant growth reverse grayish yellow [12J5]; good aerial mycelium and spores (GY) light brownish gray 3dfe; no soluble pigment. |
| Czapek's solution agar | Good growth, reverse grayish yellow [12D3]; fair to good aerial mycelium and spores (W) purplish white 13ba; no soluble pigment. |
| Glucose asparagine agar | Poor growth, reverse light yellowish brown [13H6]; poor aerial mycelium and spores (W) white b; no soluble pigment. |

PHYSIOLOGICAL PROPERTIES

| Property observed: | Characteristics |
|---|---|
| Action on milk | No curd or clearing; off white to pale yellow growth. |
| Nitrate reduction | No color with reagents after 14 days; Red color with Zn metal. |
| Gelatin liquifaction | Negative. |
| Melanin production on: | |
| Peptone-iron agar | Do. |
| Tryptone-yeast extract broth | Positive. |
| Tyrosine agar | Negative. |
| Temperature requirements on ISP No. 2 medium agar slants | Fair growth at 26° C.; abundant growth and sporulation 30–37° C.; no growth at 43° C. |

CARBON UTILIZATION

| Carbon source: | Utilization |
|---|---|
| L-arabinose | + |
| i-Inositol | + |
| Cellobiose | + |
| d-Xylose | + |
| d-Mannitol | (+) |
| d-Fructose | (+) |
| Raffinose | + |
| Sucrose | (+) |
| Rhamnose | (+) |
| d-Glucose | (+) |
| Carbon control | — |

Utilization code:
 += Good growth, and positive utilization
 (+)= Good growth
 (−)= Poor growth, probably no utilization
 —= No growth, no utilization Based on the above described taxonomic description the antibiotic producing organism of this invention has been characterized as a strain of *Streptomyces collinus*, Lindenbein. A culture similar to *S. collinus* is *Streptomyces resistomycificus*. The latter organism differs from the organism described above in that it produces melanine pigment in peptone yeast extract ion agar, tyrosine agar, and tryptone yeast extract broth. *S. collinus* produces melanine pigment in tryptone yeast extract but not in tryosene agar. Further the reverse color of *S. resistomycifficus* in reddish brown whereas the reverse color of *S. collinus* is yellow-brown.

The novel strain of the antibiotic producing organism of this invention has been deposited without restriction as to public availability in the permanent culture collection of the Northern Utilization Research and Development Division, the Agricultural Research Service, of the U.S. Department of Agriculture, Peoria, Ill., 61604, where it has been assigned the accession number, NRRL 5332.

The antibiotic of this invention, fumarylcarboxylamido-L-2,3-diaminopropionyl-L-alanine, inhibits the growth of the gram-negative organism, *Salmonella gallinarum*, the causative organism of fowl typhoid. Accordingly, the antibiotic of this invention is useful in the prevention and control of fowl typhoid, particularly in chickens. The antibiotic can be administered to the flock by incorporating an effective nontoxic concentration in the feed of the flock. More desirably, however, the antibiotic and preferably a salt of the antibiotic such as the hydrochloride salt, can be incorporated in the drinking water available to the flock.

The dipeptide antibiotic of this invention also inhibits the growth of the organism *Trichomonas vaginalis* both in vitro and in vivo. In the standard broth dilution method the minimum inhibitory concentration for the antibiotic against *T. vaginalis* was 3.9 mcg./ml. When administered subcutaneously in multiple doses of 100 mg./kg. to mice infected with this organism the effectiveness of the antibiotic was demonstrated by the extension of survival time over untreated controls.

The following examples more fully illustrate the antibiotic of the invention and its method of production.

Example 1.—Preparation of fumarylcarboxamido-L-2,3-diaminopropionyl-L-alanine by fermentation of *S. collinus* NRRL 5332

Sporulated slant cultures of *S. collinus* NRRL 5332 were prepared by incubating spores of the organism for 7 to 10 days at 30° C. on an agar medium of the following composition:

| Ingredient: | Percent by weight |
|---|---|
| Starch [1] | 1 |
| Protein [2] | 1 |
| Yeast | 0.1 |
| Agar | 2.5 |
| Distilled water to volume. | |

[1] Dextrin 700 (A. E. Staley Mfg. Co.).
[2] Traders Protein.

The pH of the agar medium was adjusted to pH 7 with 5 N sodium hydroxide prior to autoclaving.

The spores produced on the above described slant culture were gently scraped from the surface of the agar and suspended in water. The spore suspension was used as the inoculum for a vegetative medium of the following composition:

| Ingredient: | Percent by weight |
|---|---|
| Glucose | 0.5 |
| Starch | 1 |
| Soy peptone powder | 2 |
| Distiller's solubles | 0.05 |
| Tap water to volume. | |

The initial pH of the medium was pH 6.5.

The vegetative medium was placed in 250 ml. widemouth Erlenmeyer flasks and inoculated with the spore suspension. The inoculated medium was then incubated at 30° C. for 48 hours on a rotary shaker rotating at 250 r.p.m.

The incubated vegetative medium was used as the inoculum for the production medium at a 1 percent level (volume per volume). The production medium employed in the preparation of the antibiotic had the following composition:

| Ingredient: | Percent by weight |
|---|---|
| Glycerol | 2 |
| Starch | 2 |
| Soy Peptone powder | 1 |
| Yeast | 0.3 |
| Ammonium sulfate | 0.2 |
| Calcium carbonate | 0.2 |
| Water to volume. | |

The inoculated production medium was incubated for 48 hours at a temperature of 30° C.

The harvest pH of the medium ranged between pH 4.0–4.5.

Following the fermentation, the whole broth was filtered to remove mycelium and other insolubles. The filtered broth was passed over a column packed with activated charcoal and the antibiotic activity was eluated therefrom with 30 percent aqueous actone. The eluate was evaporated in vacuo to remove the acetone and the resulting aqueous solution was lyophilized to obtain a dry, crude antibiotic preparation.

The crude product was dissolved in water and chromatographed on acid-washed alumina using water as eluant. Multiple fractions were collected and each was examined on thin-layer chromatography plates (alumina or silica) using ninhydrin for visualization to determine the presence of the antibiotic. The early, slightly colored fractions, were inactive and contained fumarodiamide as shown by comparison with an authentic sample of fumarodiamide. The fractions found to contain antibiotic were lyophilized to dry solids.

The antibiotic was obtained crystalline by dissolving the solids in water with slight warming and adding to the solution of an equal volume of methanol. The colorless needles which formed were filtered and dried in vacuo for 2 hours at 100° C. to yield the purified crystalline antibiotic, fumarylcarboxyamido-L-2,3-diaminopropionyl-L-alanine, melting with decomopsition at about 275–280° C.

Elemental analysis for $C_{10}H_{16}N_4O_5$.—Calculated (percent): C, 44.11; H, 5.92; N, 20.58; O, 29.38. Found (percent): C, 44.25; H, 6.17; N, 20.23; O, 29.36.

Example 2.—Preparation of fumarylcarboxyamido-L-2,3-diaminopropionyl-L-alanine hydrochloride One gram of fumarylcarboxyamido-L-2,3-diaminopropionyl-L-alanine was suspended in 30 ml. of methanol and thoroughly mixed by stirring to form a slurry. To the slurry was added methanolic hydrochloric acid in excess and the acidified slurry was stirred for 10 minutes. The slurry was filtered and the filtrate was diluted with ether and allowed to stand while the hydrochloride salt crystallized. The crystalline hydrochloride was filtered and dried and melted with decomposition at about 235–245° C.

Elemental analysis for $C_{10}H_{16}N_4O_5 \cdot HCl$.—Calculated (percent): C, 38.80; H, 5.55; N, 18.14; O, 29.91; Cl, 11.49. Found (percent): C, 38.60; H, 5.70; N, 17.88; O, 25.42; Cl, 11.40.

We claim:
1. The antibiotic compound fumarylcarboxyamido-L-2,3-diaminopropionyl-L-alanine of the formula
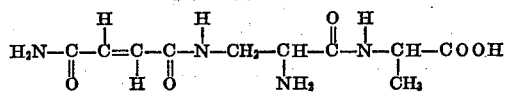
and the salts thereof formed with mineral acids.
2. The antibiotic compound of claim 1 said compound being fumarylcarboxyamido-L-2,3-diaminopropionyl-L-alanine hydrochloride.
No references cited.
ELBERT L. ROBERTS, Primary Examiner
U.S. Cl. X.R.
195—51; 424—177